United States Patent [19]

Kitagawa

[11] Patent Number: 5,211,965
[45] Date of Patent: May 18, 1993

[54] APPARATUS FOR MAKING NOODLE BASE

[75] Inventor: Yukio Kitagawa, Gifu, Japan

[73] Assignees: Kabushiki Kaisha Takashin, Gifu; Tosei Kogyo Kabushiki Kaisha, Tokyo, both of Japan

[21] Appl. No.: 839,894

[22] Filed: Feb. 25, 1992

[51] Int. Cl.⁵ .............................................. B29C 47/16
[52] U.S. Cl. .................................... 425/141; 425/188; 425/192 R; 425/461; 425/466; 426/516
[58] Field of Search ............... 425/141, 188, 190, 191, 425/192 R, 133.5, 461, 462, 466, 467; 426/516, 517; 264/176.1

[56] References Cited

U.S. PATENT DOCUMENTS

| | | | |
|---|---|---|---|
| 3,850,568 | 11/1974 | Bartha et al. | 425/466 |
| 3,854,859 | 12/1974 | Sola | 425/466 |
| 4,698,228 | 10/1987 | Straka et al. | 426/516 |
| 4,874,306 | 10/1989 | Gearhart | 425/461 |
| 4,988,278 | 1/1991 | Mills | 425/466 |

FOREIGN PATENT DOCUMENTS 3-22674  3/1991  Japan .

Primary Examiner—Richard L. Chiesa
Assistant Examiner—Khanh P. Nguyen
Attorney, Agent, or Firm—Wenderoth, Lind & Ponack

[57] ABSTRACT

An apparatus for making a noodle base having a construction wherein raw materials of a noodle base are kneaded and stretched in an arbitrary direction by a screw conveyor and extruded as a noodle base having a thick sheet-like form. The extrusion die has a split die structure consisting of a die main body having the upper surface thereof open and a cover body supported rotatably at the base end portion of the die main body and covering the open portion of the die main body, and the cover body is provided with a cover body pushing member for pushing the tip portion of the cover body lest the cover body float up, and for adjusting the height of an extrusion port of the noodle base by adjusting the height of the tip portion of the cover body relative to the die main body.

15 Claims, 10 Drawing Sheets

APPARATUS FOR MAKING NOODLE BASE

FIELD OF THE INVENTION

This invention relates to an apparatus in which an extrusion die for extruding a noodle base in a thick sheet form has a split die structure.

DESCRIPTION OF THE PRIOR ART

An apparatus for making a noodle base is an apparatus having a construction in which dough, obtained by mixing raw materials of a noodle base, is kneaded and extended in an arbitrary direction by a screw conveyor, and is then shaped into a noodle base having a thick sheet form by an extrusion die.

A conventional extrusion die for extruding the noodle base in a thick sheet form has a unitary structure having a rectangular extrusion port.

If the extrusion die for the noodle base has the unitary structure as described above, the extrusion capacity of the noodle base is constant and cannot be adjusted. There is no problem if the extrusion capacity of the extrusion die matches the capacity of the main body of the apparatus (the kneading and transfer quantity of the raw materials of the noodle base per unit time). In practice, the number of revolutions of the screw conveyor is adjustable, and the capacity of the apparatus main body can be changed.

When the extrusion capacity of the extrusion die is smaller than the capacity of the apparatus main body, the load acting on transmission gears, of the screw conveyor, chains, etc., constituting the apparatus main body becomes great, and at the same time, the load acting on the extrusion die also becomes great. When this load exceeds a certain limit, the chain, e.g., for transmitting the power is likely to be broken.

When the extrusion capacity of the extrusion die is greater than the capacity of the apparatus main body, on the other hand, both end portions of the extruded noodle base come to possess irregular shape, and so-called "buckling" occurs. When the noodle base is cut into noodles in subsequent steps, this buckling lowers the production yield of the noodle base, and the taste of the noodle, worsens as well.

Furthermore, when the hardness of the noodle base must be adjusted in accordance with the kind of noodles, so as to improve the taste of the noodles, the conventional extrusion die having the unitary structure cannot meet this demand.

SUMMARY OF THE INVENTION

In view of the problems with the conventional extrusion die having the unitary structure as described above, it is an object of the present invention to make the extrusion capacity of an extrusion die freely adjustable in accordance with the kneading-transfer quantity of noodle base raw materials from an apparatus main body by providing the extrusion die with a split die structure, including a die main body and a cover body, to make it possible to make different noodle bases having different hardnesses in accordance with kinds of noodles being prepared to prevent "buckling" of the noodle base, and furthermore to prevent an excessive load from being applied to the apparatus main body.

The present invention comprises an apparatus for making a noodle base having a construction in which dough prepared by mixing raw materials for a noodle base is kneaded and stretched in an arbitrary direction by a screw conveyor and is formed into a noodle base having a thick sheet form by an extrusion die. The extrusion die has a split die structure including a die main body having an upper surface thereof open and a cover body supported rotatably at a base end portion of the die main body covering the open portion of the die main body. The cover body is equipped with a cover body push member for pushing the tip portion of the cover body to prevent the cover body from floating up, and for adjusting the height of an extrusion port of the noodle base by adjusting the height of the tip portion of the cover body relative to the die main body.

The sectional area of the extrusion port of the extrusion die can be adjusted easily by the cover body push member. Therefore, if the sectional area of the extrusion port of the extrusion die is somewhat reduced relative to the kneading-transferring quantity of the noodle base raw materials by the apparatus main body, the extruded noodle base becomes hard to some extent. If the sectional area is larger, the extruded noodle base becomes soft to some extent. Therefore, the hardness can be delicately adjusted in accordance with the kind of noodle base. When an excessive load acts on the apparatus main body or when the extruded noodle base undergoes buckling, these phenomena can easily be avoided by adjusting the sectional area of the extrusion port of the extrusion die with the cover body push member. In other words, when the excessive load acts on the apparatus main body, the sectional area of the extrusion port of the extrusion die may be increased, and when buckling occurs in the noodle base, the sectional area may be decreased.

In this way, when the height of the extrusion port of the extrusion die is adjusted, the hardness of the noodle base can be delicately adjusted in accordance with the kind of the noodle base, and the taste of the noodle can be improved.

Furthermore, since the extrusion die has the split die structure, the noodle base solidified inside the die main body can be easily removed by removing the cover body.

DETAILED DESCRIPTION OF THE PREFERRED EMBODIMENT

Hereinafter the present invention will be explained in further detail with reference to the preferred embodiment.

Figure 1:
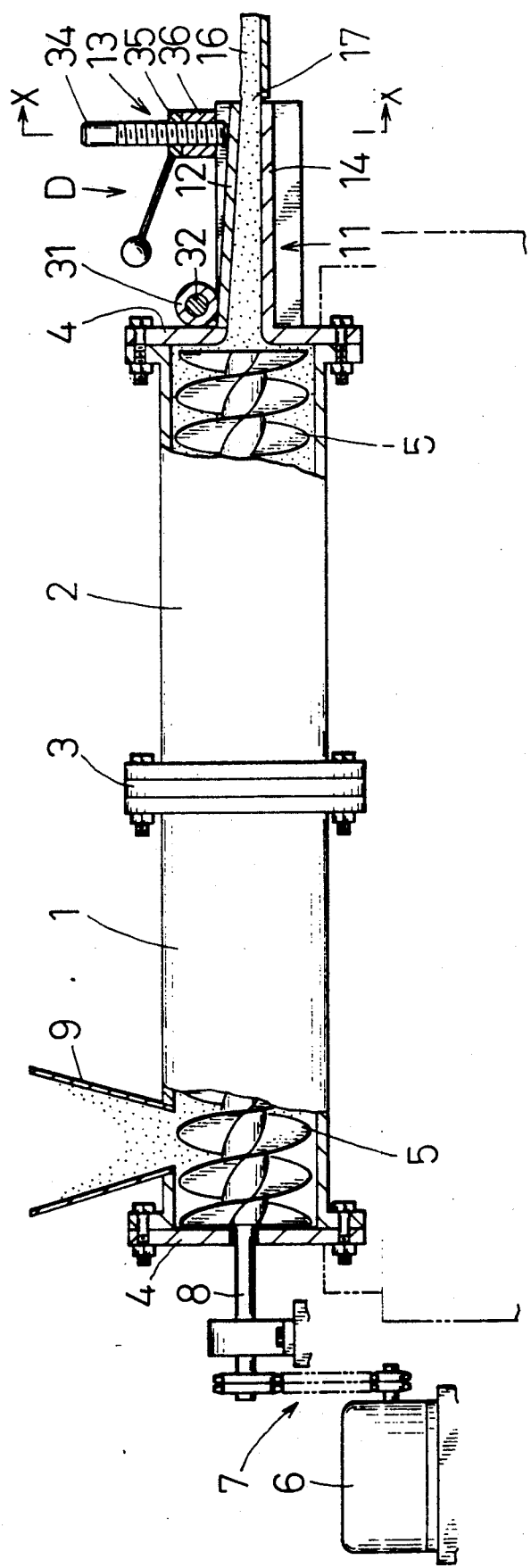
FIG. 1 is a partially cutaway front view of a noodle base making apparatus according to the present invention.

First of all, a brief explanation of the noodle base making apparatus will be made with reference to FIG. 1, and then the extrusion die according to the present invention will be explained in detail.

Two cylindrical drums 1 and 2 are connected through a disc die 3, and a side plate 4 is fitted to the open end surface of each of the cylindrical drums 1 and 2. A screw conveyor 5 is stored in each cylindrical drum 1 and 2, and the driving force of a driving motor 6 is transmitted to a rotary shaft 8 of each screw conveyor 5 through a chain-gear transmission gear 7 so as to rotate the screw conveyor 5 at a low speed.

An extrusion die D according to the present invention is fitted to the side plate 4, which is fitted to the open end surface of the cylindrical drum 2.

When raw materials for a noodle base are charged into a hopper 9 provided on the cylindrical drum 1, they are stirred and agitated while they exhibit gentle helical motion, and are sent towards the tip portion by the rotation of the screw conveyor 5. As they advance closer to the tip they are pushed more strongly and are extruded outside through the extrusion die D fitted to the tip of the cylindrical drum 2.

Next, this extrusion die D will be explained in detail with reference to FIGS. 2 to 9.

This extrusion die D is composed of a die main body 11, the upper surface of which is open, a cover body 12 for covering the open portion of the die main body 11, and a cover body push member 13 for pushing the cover body 12 to prevent the cover body 12 from floating up.

Figure 4:
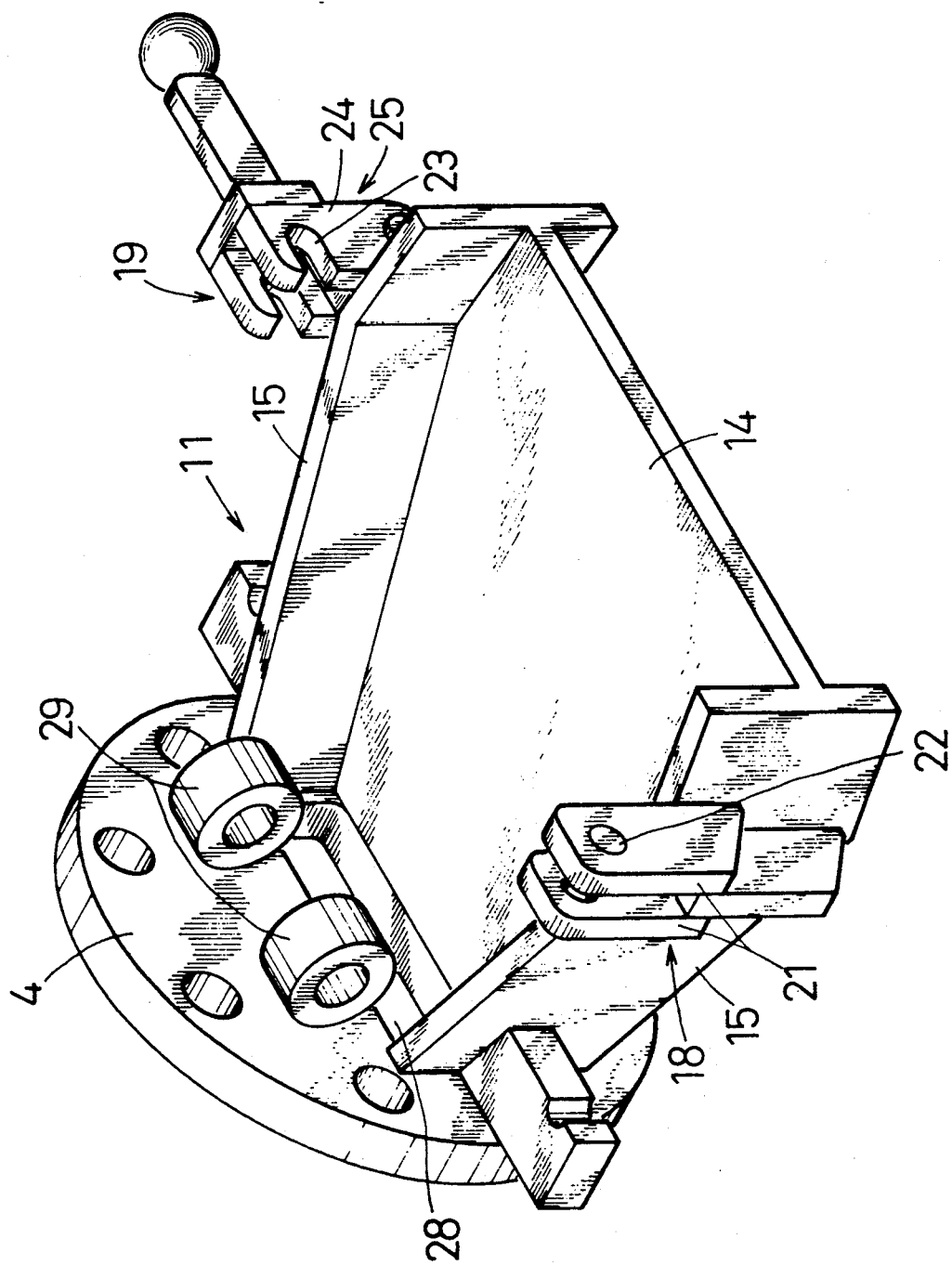
FIG. 4 is similarly a perspective view of a die main body 11 of the extrusion die D.

As shown in FIG. 4, the die main body 11 is integrally fitted to the side plate 4, which is in turn fitted to the open end surface of the cylindrical drum 2. Side plates 15 are fitted to both side portions of a bottom plate 14. The width of the side plates 15 becomes progressively greater in the extruding direction of the noodle base 16, becomes maximal immediately before the extrusion port 17, and becomes progressively smaller towards the extrusion port 17 from this maximum width portion. Fixing members 18, and 19 for fixing the cover body pushing member 13 are disposed at the maximum width portion of the die main body 11 as to face each other. The fixing member 18 has a structure in which a pin 22 is horizontally supported between a pair of sheet bodies 21 fixed to one side plate 15 with a predetermined gap therebetween. The fixing member 19 has a structure in which a pair of sheet bodies 24 equipped with an engagement groove 23 are integrally connected with a predetermined gap therebetween in such a manner as to define an engagement member 25. The engagement member 25 is rotatably supported by brackets 26 fitted to the outside of the other side plate 15.

As shown in FIG. 4, an opening 28 for extruding the noodle base 16 from the cylindrical drum 2 is disposed substantially at the center of a side plate 4 to which the die main body 11 is integrally fitted, and a pair of cylinders 29 for fitting the cover body 12 are fixed with a predetermined gap in a horizontal direction above the opening 28 in the side plate 4.

Figure 3:
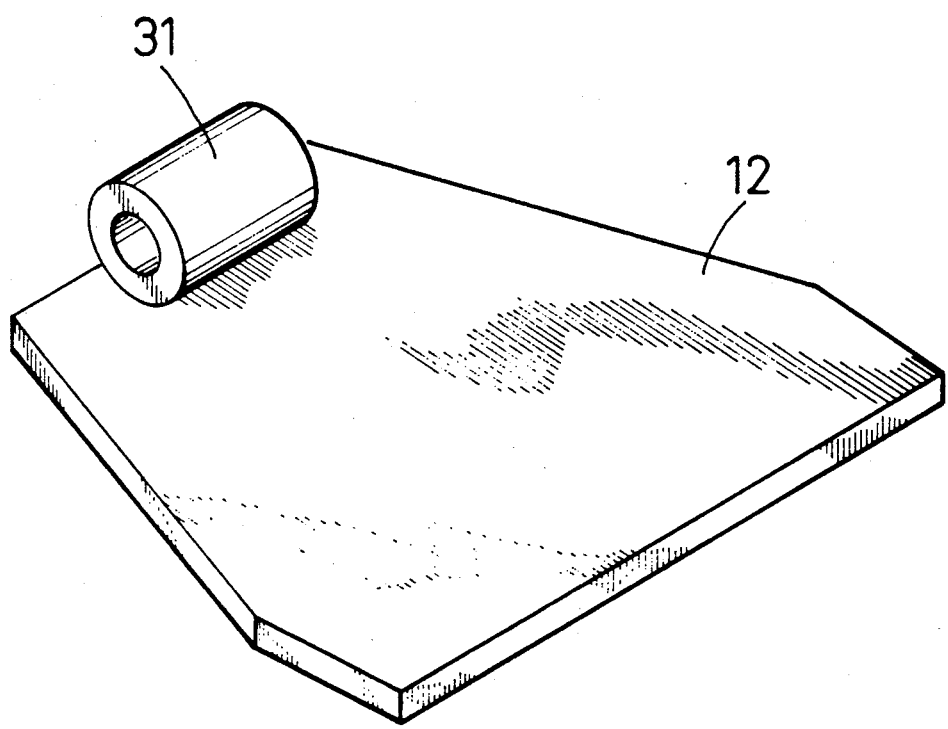
FIG. 3 is a perspective view of a cover body 12 of the extrusion die D.

As shown in FIG. 3, the cover body 12 has a shape corresponding to the planar shape of the die main body 11, and a cylinder 31 is fixedly disposed on the upper surface of the base end portion of the cover body 12. When the cylinder 31 fixed to the cover body 12 is fitted between the pair of cylinders 2 fixed to the side plate 4 as shown in FIG., and when a support point bar 32 is inserted between both cylinders 29 and 31, the base end portion of the cover body 12 is rotatably supported by the pair of cylinders 29 with the support point bar 32 being the center. When the cover body 12 is fitted to the die main body 11 in this way, the extrusion port 17 is defined between the tip portions thereof, and the height H of this extrusion port 17 (see FIGS. 8 and 10) becomes freely adjustable.

Figure 5:
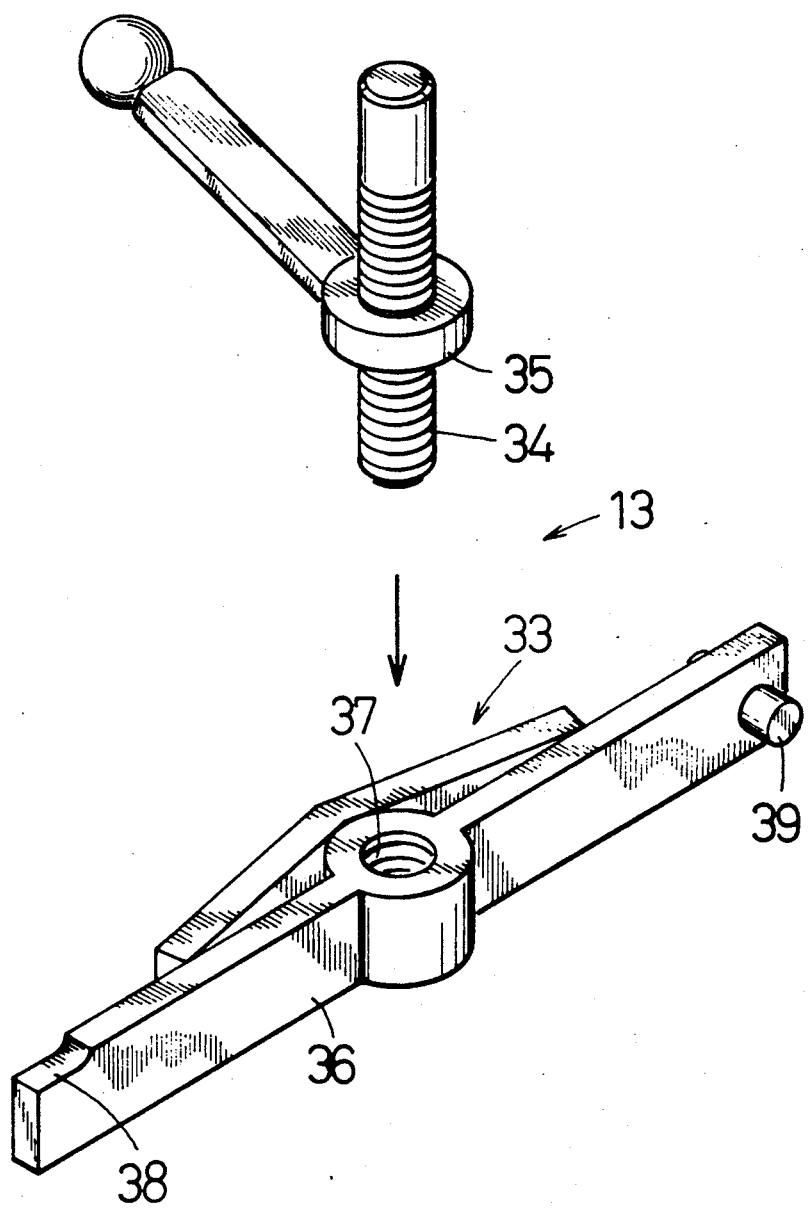
FIG. 5 is similarly a perspective view of a cover push member 13 of the extrusion die D.
Figure 6:
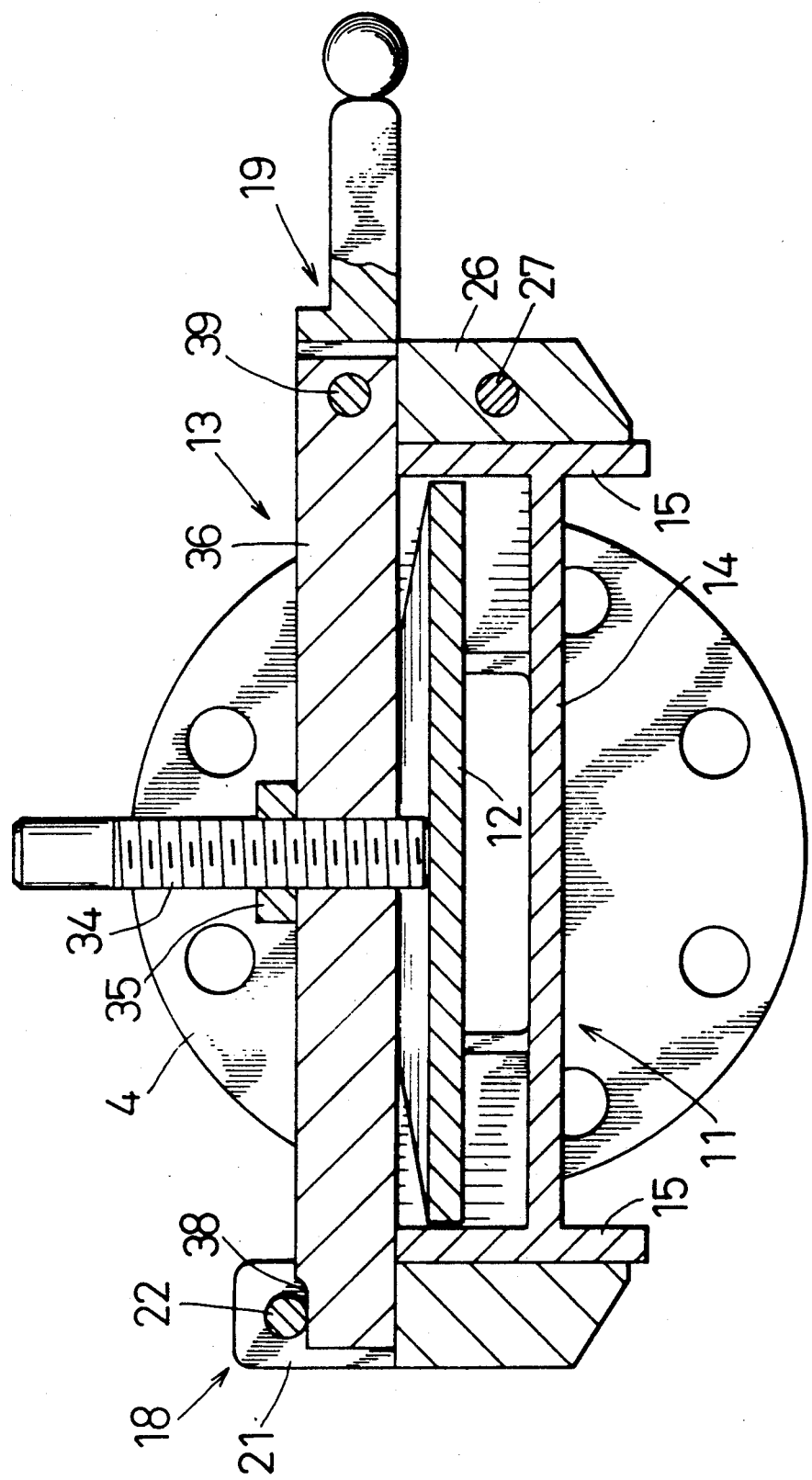
FIG. 6 is an enlarged sectional view taken along a line X—X in FIG. 1.
Figure 7:
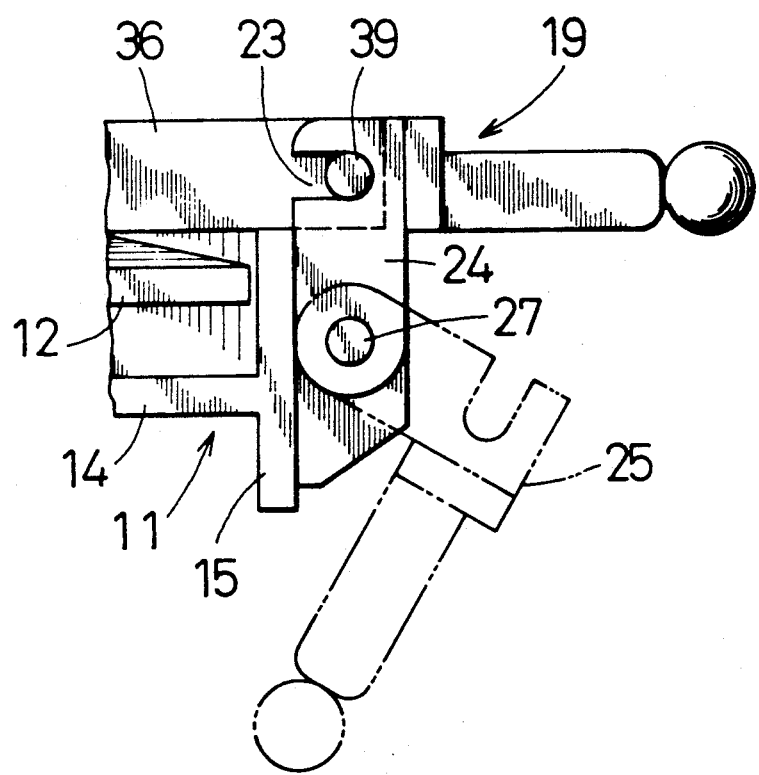
FIG. 7 is a view along an arrow Y in FIG. 2.

As shown in FIGS. 5 to 7, the cover push member 13 is composed of a push member main body 33, a pushing bolt 34 and a lock nut 35. The push member main body 33 has a female screw portion 37 corresponding to the push bolt 34 at the center of an elongated plate 36 which is longer than the maximum width portion of the die main body 11 one of the end portions of this elongated plate 36 functions as an engagement portion 38 that engages with the pin portion 22 of the fixing member 18. An engagement pin 39 is horizontally fitted to the other end portion.

Figure 2:
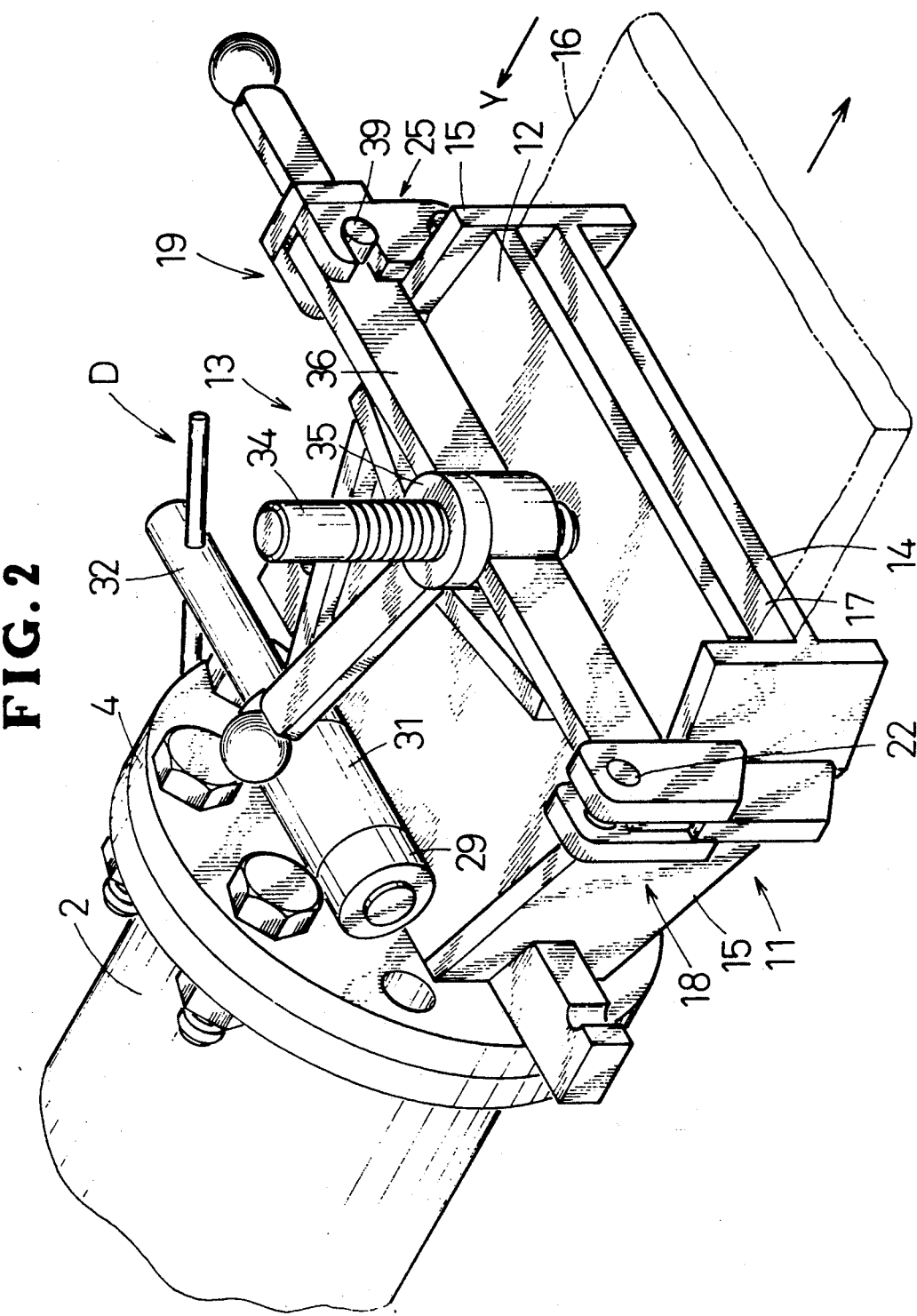
FIG. 2 is a perspective view of an extrusion die D.

As shown in FIGS. 2 and 6, the engagement portion 38 at one of the ends of the elongated plate 36 of the push member main body 33 is inserted into, and engaged with, the pin portion 22 of the fixing member 18 disposed integrally with the die main body 11. The engagement member 25 is rotated with the pin 27 as the center of rotation in order to engage the engagement groove 23 of each sheet body 24 with the engagement pin 39 fitted to the other end of the elongated plate 36. The push bolt 34 is screwed into the female screw portion 37 disposed at the center of the elongated plate 36, and the pushing bolt 34 is fixed by the lock nut 35. Then, the tip portion of the cover body 12 is pushed from above by the pushing bolt 34 to float-up of the cover body 12. Accordingly, the height H (see FIGS. 8 and 10) of the extrusion port 17 is determined.

Therefore, the adjustment of the height H of the extrusion port 17 of the extrusion die D can be carried out easily by adjusting the screw-in length of the pushing bolt 34 into the female screw portion 37 of the elongated plate 36.

Figure 8:
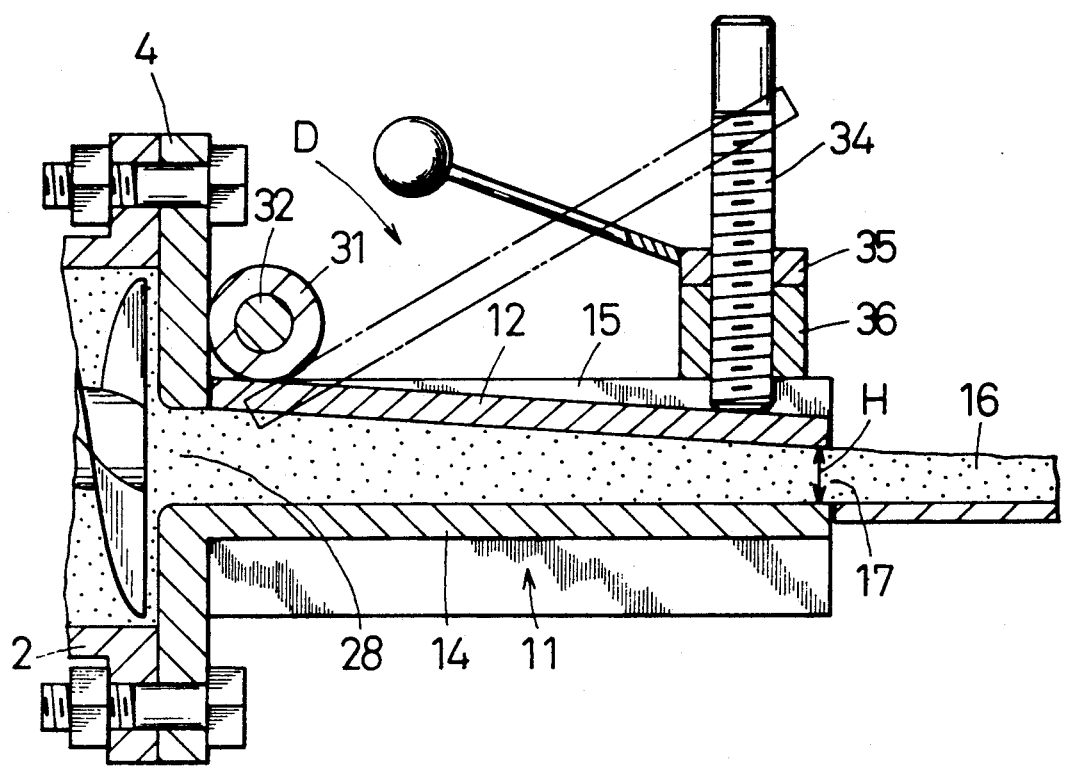
FIG. 8 is an enlarged sectional view of the extrusion die D.
Figure 9:
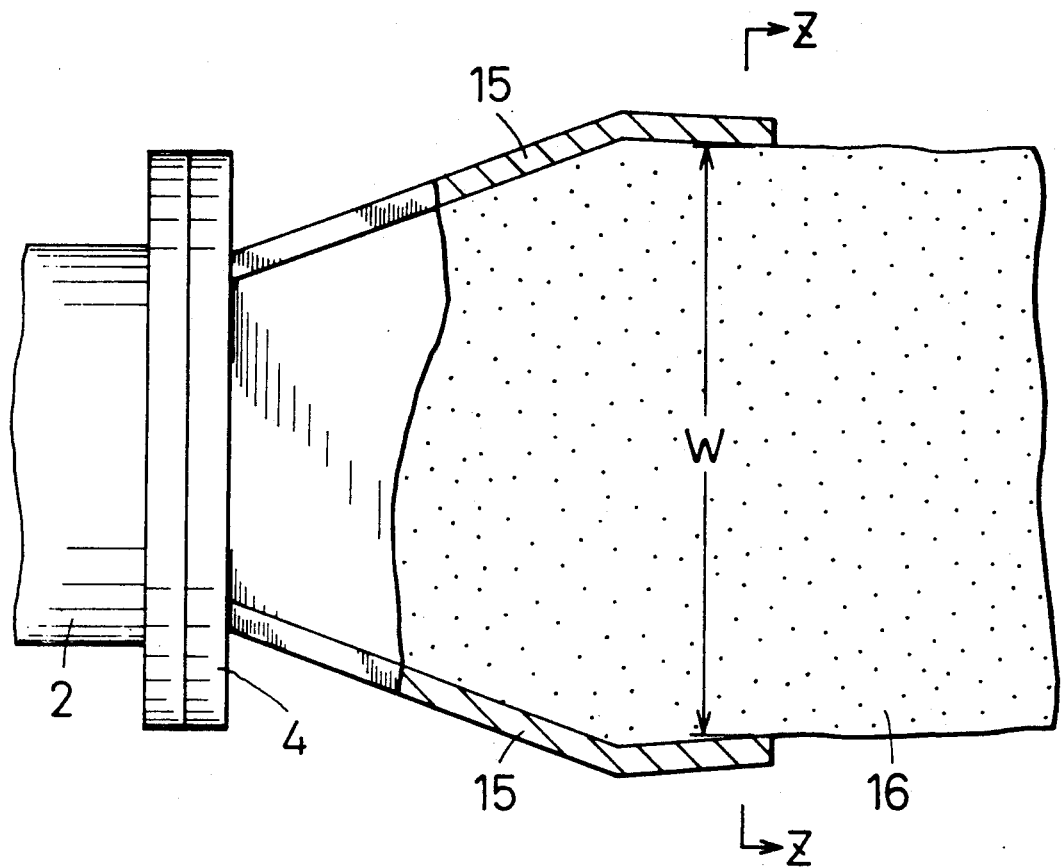
FIG. 9 is a plan view showing the state of a noodle base 16 inside the extrusion die D.
Figure 10:
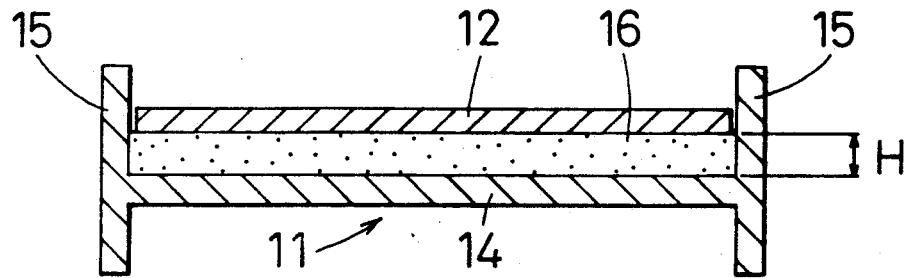
FIG. 10 is a sectional view taken along a line Z—Z in FIG. 9.
Figure 11:
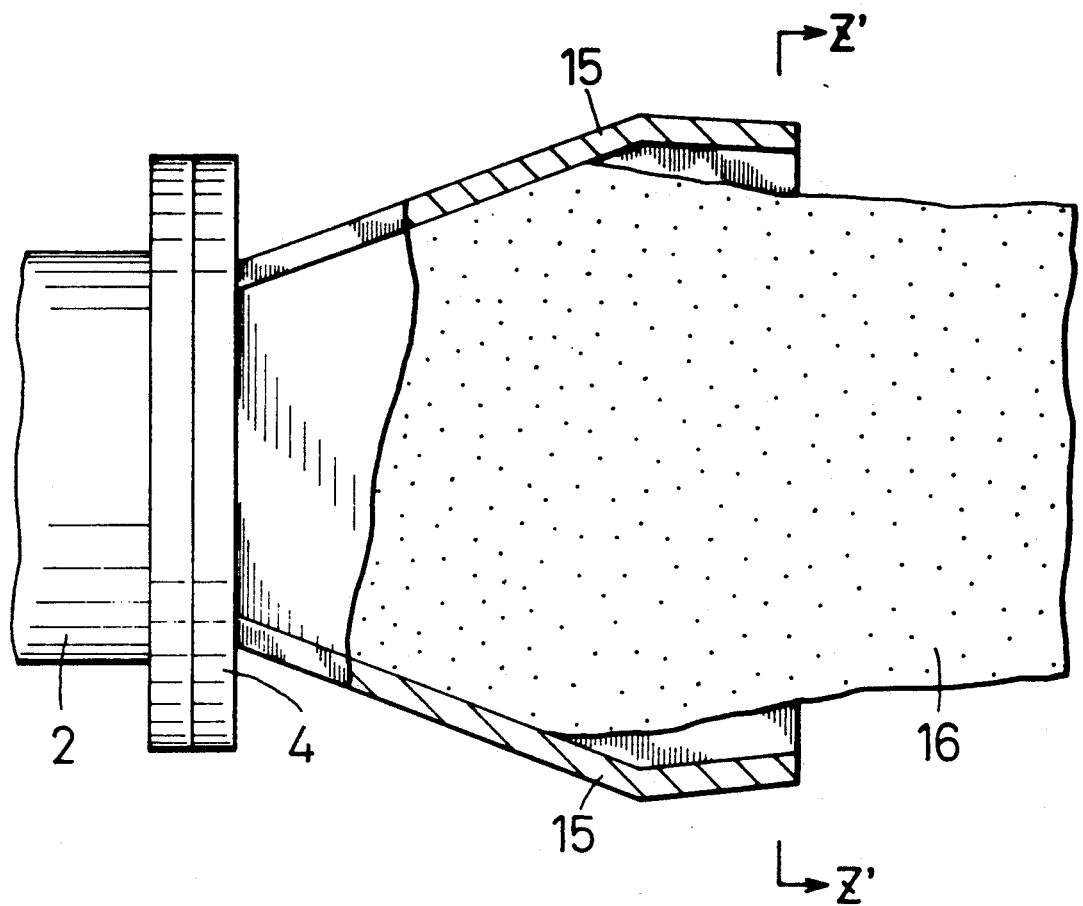
FIG. 11 is a plan view showing the state where a noodle base 16 is extruded while undergoing buckling.
Figure 12:
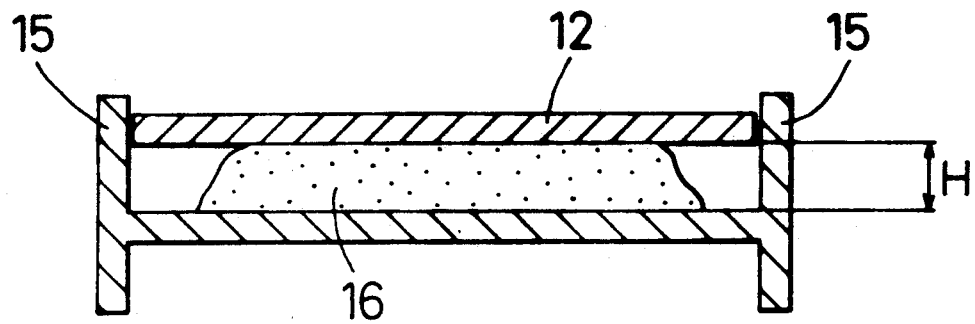
FIG. 12 is a sectional view taken along a line Z'—Z' in FIG. 11.

As shown in FIGS. 8 to 10, the noodle base 16, which has been sufficiently kneaded inside the cylindrical drums 1 and 2 is pushed into the extrusion die D through the opening 28 of the side plate 4, and its width is gradually expanded inside this extrusion die D, so that the noodle base 16 having a width W and a thickness H is continuously extruded from the extrusion port 17. As shown in FIGS. 11 and 12, if the height H of the extrusion port 17 is too great and the noodle base 16 is extruded while undergoing buckling, the screw-in quantity of the pushing bolt 34 of the cover body pushing member 13 is increased so as to decrease the height H of the extrusion port 17 of the extrusion die D so as to reduce its sectional area.

When the inside of the extrusion die D gets clogged by the noodle base 16, the cover body pushing member 13 is removed, and the cover body 12 is rotated and lifted or is separated from the die main body 11 as represented by two-dot-chain line in FIG. 8. In this way, the clogging noodle base 16 can be removed.

Incidentally, the cover body pushing member may have any structure so long as it can push the tip portion of the cover body 12 from above and can adjust the height of the extrusion port.

What is claimed is:

1. An apparatus for making a noodle base, comprising:

at least one cylindrical drum having a screw conveyor therein;

means for rotating said screw conveyor;

an inlet at one end of said conveyor for receiving raw materials of a noodle base therein; and An extrusion die at the other end of said conveyor for extruding the raw materials after having been kneaded and stretched by said screw conveyor as a noodle base, said extrusion die comprising a main die body having an open upper surface and a base end portion, a cover body rotatably supported on said base end portion of said main die body such that said cover body is rotatable to cover said open upper surface, said cover body and said open upper surface defining therebetween an extrusion port, and a cover body pushing member adjustably mounted relative to said main die body for preventing said cover body from being rotated and raised above said open upper surface beyond an adjustable limit, whereby said extrusion port is adjustable.

2. The apparatus of claim 1, wherein said cover body is rigid.

3. The apparatus of claim 1, wherein said base end portion is a plate fitted to said at least one cylindrical drum and has an opening therethrough;

said open upper surface is defined by a bottom plate extending from below said opening; and said cover body is rotatably supported on said base end portion above said opening.

4. The apparatus of claim 3, wherein said bottom plate has side plates fitted thereto along the sides thereof extending from said opening to a distal end of said bottom plate.

5. The apparatus of claim 4, wherein said cover body has a width narrower than said side plates such that said cover body can fit therebetween over said bottom plate.

6. The apparatus of claim 5, wherein said cover body pushing member comprises a bolt threaded through a female thread portion above said cover body.

7. The apparatus of claim 6, wherein said female thread portion is formed in an elongated plate removably mounted on said side plates so as to extend over said cover body.

8. The apparatus of claim 7, wherein said elongated plate is removably mounted to one said side plate by an engagement portion on one end of said elongated plate engaging pin portion of a first fixing member connected to the one said side plate, and to the other said side plate by an engagement pin on the other end of said elongated plate engaging an engagement groove of a second fixing member connected to the other said side plate.

9. The apparatus of claim 8, wherein said second fixing member is pivotably mounted on the other said side plate.

10. The apparatus of claim 6, wherein said bolt has a lock nut for fixing the bolt in position.

11. The apparatus of claim 1, wherein said cover body pushing member comprises a bolt threaded through a female thread portion above said cover body.

12. The apparatus of claim 11, wherein said female thread portion is formed in an elongated plate removably mounted so as to extend over said cover body.

13. The apparatus of claim 12, wherein:

said open upper surface is defined by a bottom plate having two side plates fitted thereto along the sides thereof;

said elongated plate is removably mounted to one said side plate by an engagement portion on one end of said elongated plate engaging a pin portion of a first fixing member connected to the one said side plate, and to the other said side plate by an engagement pin on the other end of said elongated plate engaging an engagement groove of a second fixing member connected to the other said side plate.

14. The apparatus of claim 13, wherein said second fixing member is pivotably mounted on the other said side plate.

15. The apparatus of claim 11, wherein said bolt has a lock nut for fixing the bolt in position.

* * * * *